United States Patent [19]

Neathery et al.

[11] 4,325,092
[45] Apr. 13, 1982

[54] APPARATUS FOR DETECTION OF CUE DATA CARRIED BY A RECORDING MEDIUM MOVING AT GREATLY VARYING SPEEDS

[75] Inventors: David O. Neathery, Wheaton; Edward J. Riggs, West Chicago, both of Ill.

[73] Assignee: King Instrument Corporation, Westboro, Mass.

[21] Appl. No.: 170,016

[22] Filed: Jul. 18, 1980

[51] Int. Cl.³ .......................... G11B 5/25; G11B 5/02
[52] U.S. Cl. ...................................... 360/119; 360/20; 360/67
[58] Field of Search .............. 360/113, 119, 121, 72.2, 360/74.4, 55, 18, 27, 67, 20

[56] References Cited
U.S. PATENT DOCUMENTS 3,308,449  3/1967  Uemura ............................. 360/121
4,149,204  4/1979  Marino et al. ..................... 360/119
4,159,493  6/1979  Ohta et al. ........................ 360/121

Primary Examiner—Vincent P. Canney
Attorney, Agent, or Firm—Schiller & Pandiscio

[57] ABSTRACT

An improved cue signal detector is provided for detecting on a magnetic tape which moves at greatly varying speeds a cue signal having a fixed wavelength longer than the wavelengths of other recorded information signals. The cue signal detector comprises a pick-up magnetic head for sensing a recorded cue signal, an integrator connected so that the signal output of the pick-up head is integrated with respect to time, and an amplitude level sensor for monitoring the integrator output with respect to a reference amplitude and generating a cue output signal indicative of the detection of the cue signal on the tape when the amplitude of the integrator output exceeds a predetermined level. The output of the level sensor is processed by a filter circuit to determine whether the cue signal is valid or was generated by noise.

26 Claims, 2 Drawing Figures

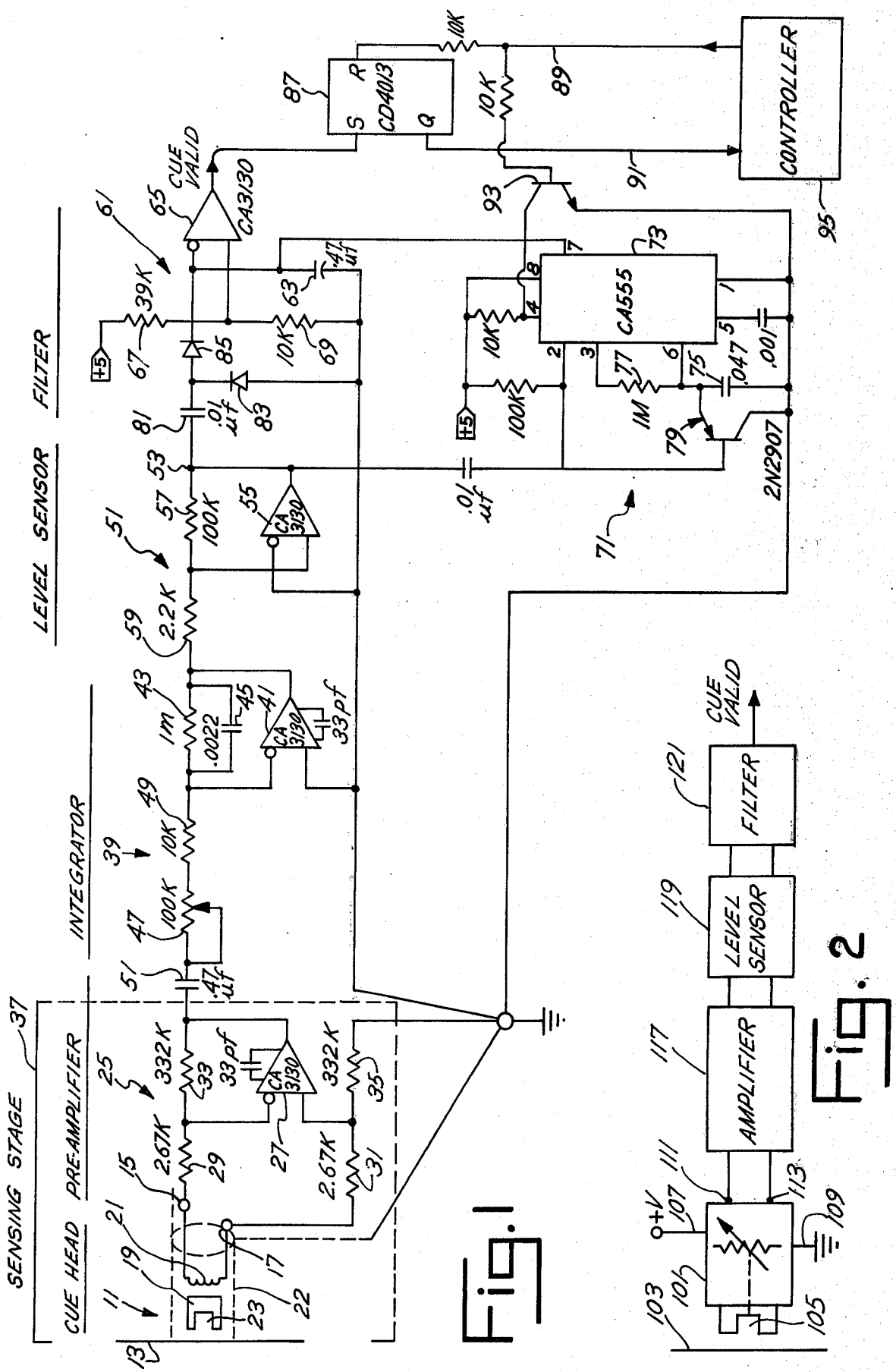

APPARATUS FOR DETECTION OF CUE DATA CARRIED BY A RECORDING MEDIUM MOVING AT GREATLY VARYING SPEEDS

BACKGROUND OF THE INVENTION

The invention relates to a system for monitoring a control signal carried by a recording medium as the medium moves past a monitoring location, and more particularly relates to a cue detection system for a magnetic tape bearing a cue signal together with other magnetic information, which detects the cue signal as the tape moves at greatly varying speeds past a cue monitoring head.

A cue tone signal is a signal recorded on a magnetic recording tape and is used to control a machine function which may be performed on the recording tape. For example, in a cassette tape loader in which empty cassettes are loaded with predetermined lengths of magnetic recording tape, a spool of tape to be cut and loaded into a plurality of cassettes will contain a cue tone signal at various locations on the tape for instructing the cassette loader to initiate a cutting and splicing operation at predetermined intervals on the recording tape. Thus, the tape loader is to ignore other magnetic information carried by the recording tape, but upon sensing the cue signal, the loader will perform a predetermined operation.

Thus, a cue detection circuit must ignore all recorded magnetic information and noise except the specific cue signal.

Heretofore, a cue tone signal has been recorded on a magnetic tape which is moved at a predetermined speed and, thus, during playback the speed must be maintained within certain limits so that the cue tone signal will be picked-up at a predetermined frequency. A band pass filter arrangement is then utilized within those limits for searching for the particular frequency of the cue tone in order to discriminate the cue tone signal from other recorded information. In some instances, the tape could be moved at a high speed and at a low speed of operation and, thus, two filters were necessary.

However, where the magnetic tape is moved at greatly varying speeds, the frequency of the recorded signals will vary in relation to the speed of the tape. Thus, the cue frequency will vary over a range of frequencies depending on the range of tape speeds. Thus, utilizing frequency to search for the cue signal becomes complicated as the recording tape takes on greatly varying speeds of movement during cue signal monitoring.

Similarly, the use of signal amplitude sensing to monitor cue signal occurence is complicated by tape movement at greatly varying speeds. The amplitude of the recording signal picked up from the magnetic tape will vary directly with the intensity of the magnetic signal and directly with the speed of the magnetic medium relative to the pick-up head. Thus, where the magnetic tape takes on greatly varying speeds, the amplitude of the signal being picked up from the tape will also greatly vary.

It is therefore an object of the present invention to provide a cue tone detection circuit for a recording medium which is moving at greatly varying speeds, despite the great variation in amplitudes and frequencies provided by the recorded cue signal via a cue pick-up head.

SUMMARY OF THE INVENTION

These and other objects of the invention are achieved in a pick-up head which is tuned to a unique recorded pattern of a cue signal carried by a recording medium, for generating an output signal having an amplitude which is the greatest when sensing the unique recorded pattern. The amplitude of the output signal is monitored with respect to a predetermined amplitude level for indicating when the cue signal has been detected.

In one embodiment, the pick-up head is an inductive pick-up which is tuned to the unique recorded pattern for generating an output signal which is integrated with respect to time for providing an integral signal having an amplitude above a predetermined level when reading the cue signal.

In the preferred embodiment, a level sensor monitors the amplitude of the output signal and generates a cyclical signal responsive to the cyclical nature of the cue signal pattern recorded on the medium. The cyclical output signal from the level sensor is processed for noise discrimination.

BRIEF DESCRIPTION OF THE DRAWING

FIG. 1 is an electrical schematic diagram of a preferred embodiment of a detection circuit of the present invention using an inductive pick-up head.

FIG. 2 is a block diagram of an embodiment of a detection circuit of the present invention using a magnetoresistive head.

DESCRIPTION OF THE PREFERRED EMBODIMENT

Referring to the FIG. 1, a magnetic cue head 11 of the inductive pick-up type is positioned in relation to a magnetic tape 13 for sensing magnetic data carried by the tape. Head 11 responsively generates a transduced voltage signal across a pair of terminals 15, 17, representative of the recorded magnetic data. The cue head is formed of a U-shaped core 19 in association with a coil 21 wound about core 19. A grounded shield 22 may be used with the head as will suggest itself.

Head 11 is tuned to a cue signal recorded on tape 13 by forming the width of a single air gap 23 in the head to correspond to the length of the magnetic tape occupied by one half cycle of the cue signal. That is, the head is tuned by making the gap width of the head and the pattern length of the recorded cue signal of a prefix relationship, i.e., a relationship in which the head gap is one half the wavelength of the recorded cue signal. Preferably, the pattern of the recorded signal is a plurality of successive magnetized tape portions of alternating polarity of a length of twelve cycles with each tape portion of equal distance of twice the head gap. For greater selectivity, multiple gaps may be employed in the head, as described hereinafter.

The output of head 11 appears across terminals 15, 17 as a time-varying alternating voltage signal. The amplitude of the voltage signal varies directly with the intensity of the magnetic signal recorded on tape 13 and varies directly with the speed of tape 13 relative to head 11. The amplitude of the voltage signal also varies in a complicated way with the signal wavelength on the medium, however this amplitude variation provides the greatest amplitude when the wavelength is equal to twice the head gap width. Where the intensity of the magnetic cue tone signal is constant, the output of the head will vary only with respect to the magnetic medium speed and the magnetic signal wavelength.

The output voltage of the magnetic head is fed to a preamplifier stage 25 for referencing the voltage appearing across terminals 15, 17 to ground. An operational amplifier 27 together with two matched pairs of resistors 29, 31, 33, 35 form a common-mode rejection amplifier for referencing the head voltage to ground. Besides a referencing function, amplifier 25 provides a gain of approximately 124. The cue head and preamplifier stage form a sensing stage 37 of the detector circuitry of the drawing.

The output voltage of stage 37 is fed to an integrator 39 comprising an operational amplifier (op amp) 41 having a feedback path connecting its output to its inverting input via a resistor 43 connected in parallel with a capacitor 45. An input circuit branch of a variable resistor 47 in series with a resistor 49 connects the output from sensing stage 37 to the inverting input of op amp 41. Preamplifier stage 25 is coupled to integrator 39 via a film capacitor 51 which filters out any small amounts of DC error generated from the preamplifier stage.

Resistor 43 serves as a DC corrector rolling the DC gain of the op amp 41 to zero. This will prevent the output of op amp 41 from increasing to a maximum voltage. Variable resistor 47 serves as a volume/sensitivity control for controlling the amplification of integrator 39.

As understood, signals picked up by head 11 may be represented in terms of sin/cosine functions, particularly, the cue signal which is recorded as a cyclical signal having a fixed wavelength. The integral of a sin function may be expressed as follows:

$$\int (\sin aX)dX = -1/a \cos aX$$

Thus, the integral of a trigonometric sin function has an amplitude which varies inversely with respect to frequency; that is, as the frequency of the input signal increases, the amplitude of the output signal decreases.

Therefore, the cue signal is recorded on tape 13 with the greatest wavelength with respect to other recorded information on the recording tape. The frequency of the cue signal is to be the lowest frequency of signals picked up by head 11 over the full range of tape speeds, and thus sensing of the cue signal will result in the the highest amplitude output signal from integrator 39. As will suggest itself, the cue signal wavelength will be determined in accordance with the range of tape speeds and range of wavelengths of other recorded information on the tape, in order to ensure that the frequency of the cue signal will be the lowest.

In order to monitor the expected amplitude value from integrator 39 which indicates cue signal detection, a level sensor 51 is connected to the output of integrator 39 for monitoring the amplitude of the integrated signal with respect to a reference voltage. When the output of integrator 39 exceeds the reference voltage, level sensor 51 generates an output signal at a circuit node 53.

Level sensor 51 includes an operational amplifier (op amp) 55 operating as a voltage comparator with hysteresis. Op amp 55 includes a feedback path connecting output node 53 to its noninverting input via a resistor 57. The output of integrator 39 is connected to the noninverting input of op amp 55 via a resistor 59. As the output of integrator 39 reaches a predetermined value, the output of op amp 55 begins to change causing the feedback connection of resistor 57 to change the input voltage to encourage a quick changing of the output. Once the output has changed voltage levels, the input voltage from integrator 39 must decay to a level below the predetermined voltage which triggered op amp 55 in order for op amp 55 to switch its output level. Thus, op amp 55 operates in a hysteresis fashion as a Schmitt trigger.

Op amp 55 operates as a bi-stable device generating a HIGH output (+5 volts) or a LOW output (−6 volts) in accordance with the level of input to level sensor 51. The recommended power supply for the CA3130 operational amplifiers is +5 volts, −6 volts with respect to ground. As will suggest itself, level sensor 51 may include other voltage comparators, or the like, for monitoring the amplitude of the output of integrator 39 in order to provide a signal indicative of the integrator output reaching a predetermined amplitude value. The output of op amp 55 will be a cyclical pulse output having a frequency corresponding to the frequency of the cue signal, when head 11 is sensing the cue signal data.

The preferred embodiment utilizes a filter circuit 61 to discriminate whether noise has actuated level sensor 51 or whether monitoring of the cue signal has actuated level sensor 51. Filter circuit 61 looks for a number of pulses from the level sensor and monitors the pulses with respect to time for determining whether or not a pulse is missing from the output of level sensor 51, and thus noise has been monitored. The cue tone signal recorded on the recording tape will include 12 cycles. Noise on the other hand will have one or possibly two transitions depending upon the type of noise. Thus, when monitoring the cue tone signal, the output of level sensor 51 will switch 12 times as the cue data passes cue head 11, whereas noise may cause level sensor 51 to switch once or twice.

Filter circuit 61 includes a storage capacitor 63 for receiving buckets of charge successively pumped into capacitor 63 at the frequency of the cyclic output of level sensor 51. The voltage across capacitor 63 is monitored by an operational amplifier 65 for generating a CUE valid signal whenever a predetermined voltage appears across capacitor 63. Operational amplifier 65 serves as a comparator for monitoring the voltage across capacitor 63 with respect to a reference voltage defined by a voltage divider network formed of a resistor 67 connected in series with a resistor 69, the branch of which is connected across a five volt source and ground, as shown.

A timing circuit 71 effectively monitors the time between output switchings of level sensor 51 for responsively discharging capacitor 63 whenever the time between switchings exceeds a preset value. Circuit 71 includes an integrated circuit 73 (a CA555) having a pin 7 connected to one side of capacitor 63. Pin 7 has a controllable output for providing a short circuit across capacitor 63 to discharge the same or for providing an open circuit across capacitor 63 to permit charging the same. Pin 2 of chip 73 is connected to the output of level sensor 51 for releasing pin 7 from ground. Thereafter, pin 7 is driven to ground only when the voltage at pin 6 of chip 73 reaches a predetermined value. the voltage at pin 6 is controlled by a capacitor 75 which is charged by current leaving pin 3 of chip 53. Pin 3 is connected to capacitor 75 via a resistor 77, which controls the magnitude of the current which charges capacitor 75.

The switching output of level sensor 51 successively discharges capacitor 75 via a discharge transistor 79 having its emitter-collector path connected across capacitor 75. The output of op amp 55 is connected to the base of transistor 79 for successively turning transistor 79 ON with each switching of level sensor 33.

So long as level sensor 51 switches within a predetermined period of time, capacitor 75 will not be permitted to reach a voltage for causing grounding of pin 7.

Capacitor 63 receives buckets of charge from a capacitor 81 which is charged each time the output of level sensor 51 goes LOW. When level sensor 51 goes LOW, capacitor 81 is charged via ground through the anode-cathode junction of a diode 83. Capacitor 81 remains charged until the output of level sensor 51 goes HIGH, upon which charge flows through capacitor 81, passing through the anode-cathode junction of a second diode 85 into capacitor 63. Thus, as level sensor 51 switches during monitoring of the cue signal, capacitor 63 is successively charged to a predetermined value at which op amp 65 generates a CUE valid signal indicating cue tone detection.

Should spurious signals or other noise cause a switching of level sensor 51, timing circuit 71 will reset capacitor 63, holding capacitor 63 reset until level sensor 51 begins its switching function again.

The output of operational amplifier 65 is fed to a latch buffer formed from a flip flop 87 (a CD4013). Flip flop 87 is set responsive to amplifier 65 generating a CUE valid signal. The flip flop can be reset by a system controller 95 via a reset conductor 89 connected to the reset input of flip flop 87. Controller 95 may selectively look at the output state of the flip flop via an output conductor 91 every so often in order to monitor the sensing of the cue signal. Reset conductor 89 also serves to reset timing circuit 71 by grounding pin 4 of integrated circuit 73 via a transistor 93 having its base connected to reset conductor 89 as shown.

As stated above, inductive pick-up head 11 may include multiple gaps for increasing the sensitivity of the head to the unique cue tone pattern recorded on the tape. As understood, the use of several gaps will significantly increase sensitivity of the magnetic head as the head monitors a recorded signal having a pattern related to the gap pattern in the head for producing an output signal from the head having the greatest amplitude when sensing the related pattern. Such a multiple gap head serves to eliminate any problem of the magnetic head picking up harmonics of the cue tone in the recorded information carried by the tape. As understood, the gap widths of the multiple gap head may be different, and, for example, a "chirp" tone may be utilized in which the gaps in the head are successively of different sizes.

Referring to FIG. 2, a second embodiment is shown in which a magnetoresistive head 101 is utilized for monitoring a unique cue tone pattern recorded on tape 103. Unlike the inductive pick-up head 11 of FIG. 1, the magnetoresistive head 101 monitors the pattern of the recorded signals on tape 103 in relation to its gap 105 for changing its resistance in accordance with the magnetic field across gap 105. Electrically, magnetoresistive head 101 looks like a resistor having its value changed in accordance with the magnetic field appearing across the gap. Head 101 is loaded with a DC current via conductors 107, 109 for generating a voltage output across circuit nodes 111, 113 which varies in amplitude in relation to the changing resistance of magnetorestrictive head 101. Thus, the amplitude of the output voltage appearing across nodes 111, 113 is the greatest when the pattern being monitored on tape 103 most closely correlates to the pattern of the head gap.

Unlike the amplitude of the output of inductive pickup head 11 of FIG. 1, the amplitude of the output of magnetoresistive head 101 of FIG. 2 is insensitive to the speed of the tape. Thus, output nodes 111, 113 may be connected to an amplifier section 117 for passing the picked-up signal to a level sensor 119 without the need for the use of an integrator as in FIG. 1. Amplifier 117 may be constructed from components similar to preamplifier 25, and level sensor 119 may be constructed similarly to level sensor 51 of FIG. 1. A filter circuit 121 similar to filter circuit 61 may filter the output of level sensor 119 for discriminating against noise pick-up by head 101.

It should be understood, of course, that the foregoing disclosure relates to a preferred embodiment of the invention, and that modifications or alterations may be made therein without departing from the spirit or scope of the invention as set forth in the appended claims.

What is claimed is:

1. A cue detector for sensing cue data recorded together with other informational data on a recording medium where the cue data has a fixed wavelength lambda longer than the wavelength of the other informational data and the recording medium is moved at varying speeds, said cue detector comprising:
   sensing means positioned in sensing relation to said recording medium and tuned for providing an output signal having the greatest amplitude when reading data of lambda wavelengths;
   integrator means for receiving said output signal and responsively generating an integral signal representative of the integral of said output signal; and
   level sensor means for comparing the amplitude of the integral signal with respect to a reference amplitude and responsively generating a cue detection signal for indicating detection of said cue data by said sensing means.

2. A magnetic cue signal detector for sensing a cue signal recorded together with other magnetic information on a recording medium where the cue signal has a fixed wavelength lambda longer than the wavelength of the other magnetic information and the recording medium is moved at varying speeds, comprising:
   sensing means for generating an output signal having the greatest amplitude when sensing signals having lambda wavelength, said sensing means including inductive pickup magnetic head means positioned in a sensing relation with respect to the recording medium and tuned to pick up lambda wavelengths;
   integrator means for receiving said output signal and generating an integral signal representative of the integral of said output signal; and
   amplitude comparing means for monitoring the amplitude of said integral signal with respect to a reference amplitude and responsively generating a cue detection signal for indicating detection of said cue tone signal on said recording medium when the integral signal amplitude exceeds a predetermined level relative to said reference amplitude.

3. A cue signal detector according to claim 2 wherein said magnetic head means includes: an inductive pickup magnetic head having a head gap of substantially one half lambda; and signal referencing means responsive to the voltage output across the magnetic head for generating a reference signal with respect to ground representative of the signal picked up by said magnetic head.

4. A cue signal detector according to claim 3 wherein said signal referencing means includes a balanced operational amplifier providing offset voltage elimination for generating said reference signal.

5. A cue signal detector according to claim 2 wherein said integrator means includes a potentiometer for adjusting the gain of said integral signal.

6. A cue tone detector according to claim 2 wherein said integrator means includes an op amp having a feedback path from its output node to its noninverting input, said feedback path including: a capacitor; and a resistor connected in parallel with said capacitor.

7. A cue signal detector according to claim 2 wherein said amplitude comparing means includes: means for generating a reference voltage level; and voltage comparator means for comparing the amplitude of said integral signal with respect to said reference voltage level.

8. A cue signal detector according to claim 7 wherein said reference voltage level means includes a conductor connected to ground; and wherein said voltage comparator means includes: an op amp having its inverting input connected to said reference voltage level means; and a feedback path connecting the output of said operational amplifier to its noninverting input; first resistance means connected in said feedback path; and second resistance means connecting said noninverting input of said integrator means.

9. A cue signal detector for sensing a cue signal recorded together with other magnetic data on a recording medium, the cue signal having a fixed wavelength lambda longer than the wavelength of the other magnetic data and the recording medium being moved at varying speeds, comprising:
sensing means positioned in a sensing relation with respect to the recording medium for sensing magnetic data and tuned for providing an output signal having the greatest amplitude when sensing signals of lambda wavelength;
integrator means for receiving said output signal and generating an integral signal representative of the integral of said output signal;
amplitude comparing means for monitoring the amplitude of the integral signal with respect to a reference amplitude for responsively generating a cue detection signal for indicating detection of said cue signal on said recording medium; and
filter processing means connected to receive said cue detection signal for filtering said cue detection signal from noise signals, said filter processing means generating a cue valid signal whenever said cue detection signal is generated in response to said sensing means sensing said cue signal on said recording medium.

10. A cue signal detector according to claim 9 for sensing due data recorded with greater than two cycles on said recording medium, and wherein said filter processing means monitors the cyclical pattern of said cue detection signal for generating said cue valid signal.

11. A cue tone detector according to claim 10 wherein said filter processing means includes a missing pulse detector for monitoring the time between cyclings of said cue detection signal for determining the cyclical duration of said cue detection signal.

12. A cue tone detector according to claim 11 wherein said filter processing means further includes means for monitoring the number of cycles in said cue detection signal and generating a cue valid signal responsive to a predetermined number of cycles being generated in said cue detection signal.

13. A cue tone detector according to claim 12 wherein said means for monitoring is resettable for initiating counting of cycles; and wherein said missing pulse detector is connected to said means for monitoring for resetting the same whenever the predetermined delay exists between cyclings of said cue detection signal.

14. A cue tone detector according to claim 12 wherein said means for monitoring includes a storage capacitor; and charge pump means responsive to the output of said amplitude comparing means for charging said storage capacitor with a predetermined charge in conjunction with the cycling of said comparing means; and voltage comparator means for monitoring the voltage across said storage capacitor means with respect to a reference voltage level for generating said cue valid signal when said voltage on said storage capacitor reaches said predetermined reference voltage level.

15. A cue tone detector according to claim 14 wherein said missing pulse detector includes discharge means for shorting said storage capacitor; and means for monitoring the time between cyclings of said comparing means, said means for monitoring being responsive to a predetermined time period between cycles for triggering said discharge means.

16. A cue tone detector according to claim 14 and further including latch buffer means responsive to said cue valid signal for generating a latched output, said latch buffer means being resettable by a reset signal.

17. A cue tone detector according to claim 16 and further including controller means for monitoring the output of said latch buffer means and connected thereto for selectively resetting said latch buffer means.

18. A cue detector for sensing cue data recorded together with other informational data on a recording medium, the cue data having a unique magnetic pattern, and the recording medium being moved at varying speeds, comprising: sensing means positioned in sensing relation to said recording medium and responsive to said unique magnetic pattern recorded on said tape for responsively generating a first voltage signal having an amplitude which (a) is greatest when sensing said pattern as compared to sensing of other informational data recorded on said recording medium and (b) varies directly with the speed of the recording medium relative to the sensing means; integrator means responsive to said voltage signal for generating a second voltage signal having an amplitude which varies inversely with the frequency of said first voltage signal; and level sensor means for comparing the amplitude of said second voltage signal with a predetermined reference amplitude and responsively generating a cue detection signal indicative of detection of said cue data by said sensing means when said second voltage signal exceeds said predetermined reference amplitude.

19. A cue detector according to claim 18 wherein said sensing means includes a magnetoresistive head means positioned in a sensing relation with respect to the recording medium and having gap means tuned to pick-up said unique pattern.

20. A cue detector according to claim 19 wherein said gap means includes multiple gaps, each of said gaps having a width corresponding to the length of a magnetized portion of said tape in said unique pattern.

21. A cue detector according to claim 18 where said level sensor means includes: means for generating a reference voltage; and voltage comparator means for comparing the amplitude of said second voltage signal with the amplitude of said reference voltage.

22. A cue detector according to claim 18 and further including filter processing means connected to receive said cue detection signal and adapted for filtering said cue detection signal from noise signals and generating a cue valid signal whenever said cue detection signal is generated in response to said sensing means sensing said cue signal on said recording medium.

23. A cue detector according to claim 22 for sensing cue data recorded with greater than two cycles on said recording medium, and wherein said filter processing means monitors the cyclical pattern of said cue detection signal for generating said cue valid signal.

24. A cue detector according to claim 23 and further including latch buffer means responsive to said cue valid signal for generating a latched output, said latch buffer means being resettable by a reset signal.

25. A cue detector according to claim 24 and further including controller means for monitoring the output of said latch buffer means and for selectively resetting said latch buffer means.

26. A magnetic cue signal detector for sensing a cue signal recorded together with other magnetic information on a recording medium where the cue signal has a unique magnetic pattern with respect to the other magnetic information on the tape and the recording medium is being moved at varying speeds, comprising: sensing means for generating an output signal having the greatest amplitude when sensing said unique magnetic pattern, said sensing means including magnetic head means positioned in a sensing relation with respect to the recording medium and tuned for picking up said unique magnetic pattern and responsively generating an output signal representative of said unique magnetic pattern; integrator means for receiving said output signal and generating an integral signal representative of the integral of said output signal; and means for monitoring the amplitude of said integral signal and for responsively generating a cue detection signal indicative of detection of said cue tone signal on said recording medium when the amplitude of said integral signal exceeds a predetermined level.

* * * * *